(12) United States Patent
Buschmann

(10) Patent No.: US 10,911,098 B2
(45) Date of Patent: Feb. 2, 2021

(54) INTERLOCKING CIRCUIT AND PROCEDURE FOR BLOCKING A DATA LINE

(71) Applicant: Hella GmbH & Co. KGaA, Lippstadt (DE)

(72) Inventor: Peter Buschmann, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 366 days.

(21) Appl. No.: 15/758,977

(22) PCT Filed: Sep. 12, 2016

(86) PCT No.: PCT/EP2016/071447
§ 371 (c)(1),
(2) Date: Mar. 9, 2018

(87) PCT Pub. No.: WO2017/046032
PCT Pub. Date: Mar. 23, 2017

(65) Prior Publication Data
US 2020/0235779 A1 Jul. 23, 2020

(30) Foreign Application Priority Data

Sep. 18, 2015 (DE) .................. 10 2015 012 002

(51) Int. Cl.
*H04B 3/23* (2006.01)
*H05B 47/18* (2020.01)
*H05B 45/30* (2020.01)
*B60Q 1/02* (2006.01)
*B60R 16/03* (2006.01)
*H04L 12/40* (2006.01)

(52) U.S. Cl.
CPC ............... *H04B 3/232* (2013.01); *B60Q 1/02* (2013.01); *B60R 16/03* (2013.01); *H04L 12/40* (2013.01); *H05B 45/30* (2020.01); *H05B 47/18* (2020.01); *H04L 2012/40215* (2013.01)

(58) Field of Classification Search
CPC ........... H04B 3/232; B60Q 1/02; H04L 12/40; H04L 2012/40215; B60R 16/03; H05B 47/18; H05B 45/30
USPC ........................................................ 375/257
See application file for complete search history.

(56) References Cited

U.S. PATENT DOCUMENTS

| 7,298,711 | B1* | 11/2007 | Jarcy | H04B 3/23 370/286 |
| 8,249,134 | B2* | 8/2012 | Kumar | H04L 25/029 370/272 |
| 2004/0263346 | A1 | 12/2004 | Neal | |
| 2005/0275562 | A1 | 12/2005 | Watanabe | |
| 2007/0042721 | A1 | 2/2007 | Gupta et al. | |
| 2009/0067616 | A1* | 3/2009 | Suhre | H03K 3/037 379/406.06 |

(Continued)

*Primary Examiner* — Hirdepal Singh
(74) *Attorney, Agent, or Firm* — Husch Blackwell LLP

(57) ABSTRACT

An interlocking circuit and procedure for suppressing an echo on a receiving line are provided. The interlocking circuit blocks the receiving line when there is a signal on a transmission line. The receiving line has a transmission side at which the echo signal is located and a receiving side at which the echo signal can be blocked. The echo signal of a CAN driver is suppressed such that an actuating component for a headlamp light matrix does not receive any unwanted commands.

6 Claims, 8 Drawing Sheets

(56) References Cited

U.S. PATENT DOCUMENTS

| | | | | |
|---|---|---|---|---|
| 2012/0115412 A1* | 5/2012 | Gainey | ............... | H04L 5/0007 |
| | | | | 455/7 |
| 2013/0273834 A1* | 10/2013 | Sundstrom | ............ | H04B 15/00 |
| | | | | 455/7 |
| 2014/0064519 A1* | 3/2014 | Silfvast | ................ | H04H 60/04 |
| | | | | 381/119 |
| 2014/0226698 A1* | 8/2014 | Negus | ............... | H04B 7/15592 |
| | | | | 375/211 |
| 2015/0009867 A1* | 1/2015 | Choi | ..................... | H04L 25/00 |
| | | | | 370/278 |

* cited by examiner

INTERLOCKING CIRCUIT AND PROCEDURE FOR BLOCKING A DATA LINE

CROSS REFERENCE

This application claims priority to PCT Patent Application No. PCT/EP2016/071447, filed 12 Sep. 2016, which itself claims priority to German Application No. 10 2015 012002.6, filed 18 Sep. 2015, the entirety of both of which are hereby incorporated by reference.

FIELD OF THE INVENTION

The invention concerns a locking circuit and a procedure for blocking a data line.

BACKGROUND OF THE INVENTION

Adaptive headlights can implement various functions, such as cornering light, high beam, low beam, apron lighting and chase lighting with animation. Even functions adapted to ambient conditions, such as light beams with a black tunnel so as not to blind oncoming drivers while all other areas are lit by high beam light, can be implemented.

Lighting is commonly implemented using a matrix of lighting elements, primarily LEDs. These individual lighting elements can be switched independently of each other in order to generate various lighting patterns (functions). For easier actuation of this type of matrix, special integrated components were designed, e.g. the light matrix manager (LMM) for vehicle systems TPS92661. When this manager is used, the brightness of each light element is controlled using a PWM controller. This happens individually for each lighting element (LED). In order to control the PWM ratio, the LMM provides a record set that can be configured using serial communication (UART—Universal Asynchronous Receiver Transmitter).

This type of component features an internal state machine that correctly processes only certain defined commands. If this machine receives an unknown command or unusable data, then there is a risk that the state machine will hang, impeding the component function.

The publication DE 103 40 806 83 explains how a simple interface circuit makes it easier to recognize a short circuit or access collision on a single-wire cable in UART operation. Here, an OR gate is used. It compares the address bit of a data signal in the transmission and receiving path. The result is made available using a separate diagnostics pin.

SUMMARY OF THE INVENTION

A basic aspect of this invention is that it prevents echoing on a second data line that is present due to a signal on an initial data line. There are components that generate this type of echo. This echo may, in turn, interfere with other components and impede their function. Echo suppression makes it possible to use both types of component at the same time.

An interlocking circuit for suppressing an echo on a receiving line blocks the receiving line in the event that a signal is present on a transmission line. The receiving line in this setup features a transmission side where the echo signal is present and a receiving side where the echo signal can be blocked.

A "signal" here refers to changing a voltage level from a basic level to another level. This level can be used to define binary values (bits). One signal typically represents one bit in this case, particularly in observing the available measurements. A sequence of signals (plural), potentially representing multiple bits forming a data word, for example, can also be referred to as a "signal" under certain circumstances.

This type of interlocking circuit is especially suitable for two single-wire data lines, i.e. for a transmission and receiving line, enabling bi-directional communication in full-duplex operation between two communication partners.

An example of this type of communication may be serial data transmission on a serial bus. Various bus protocols can be used on this bus, such as RS232, SPI (Serial Peripheral Interface, $I^2C$ (I-squared-C) or UART.

Of the two, the line that is to be made lockable is the one that is reached by data being transmitted from the echo-generating component to the communication partner. It would be unfavorable for both communication partners to produce echoes.

Different solutions for locking or blocking the output line are feasible, such as those implemented discretely using transistors, similarly to a transmission gate. The following proposes a solution using digital logic.

In a particular embodiment, a control signal derived from the transmission signal may be present on a control line in the interlocking circuit. The control line is connected to the input of an inverter that has an output connected to an input for an OR gate for signals with negative logic or an AND gate for signals with positive logic. A second input of the gate is connected to the transmission side of the receiving line and the output of the gate is connected to the receiving side of the receiving line.

This provides an advantage in that the circuit may be implemented with low hardware outlay. High-outlay alternatives such as elaborate calculation using a microcontroller or error handling upon receipt of an echo, can be avoided in this way.

In the simplest case, the control signal can even be the transmission signal itself. The derivation does not refer to a derivation in the mathematical sense. Instead, it refers to a dependency, i.e. the control signal is determined from the state or course of the transmission signal.

The description of the circuit also includes circuit variants for which additional components are used, provided that they do not change the circuit logic. These may include buffer elements or driver stages.

In a particular embodiment, a delay circuit has an effect on the control signal so that the interlocking circuit locks for a longer period of time than the signal is present on the transmission line.

This provides an advantage in that the echo signal can be completely suppressed. Otherwise, there is a risk that, if a transmission signal is no longer present but the delayed echo is still active, this residual echo will still be visible on the receiving line.

The complete interlocking circuit consists of two parts, namely of the delay circuit and the actual interlocking circuit itself. To prevent the receiving line from being enabled too early, the control signal, which moves the interlocking circuit for locking, must be extended. The delay circuit also extends the control signal on the transmission line beyond the end of the signal.

In a particular embodiment of the interlocking circuit, the delay circuit connects the transmission line to the control line using a diode. Furthermore, this configuration involves connecting the control line to the supply voltage over a resistor (R1) and to ground over a capacitor (C1).

Advantageously, it is also possible to achieve a low hardware outlay here. Other implementation ideas, such as a timer in a microcontroller or interruption control, appear to be more costly.

The diode here is switched in the locking direction, i.e. the transmission line is connected to the cathode and the transmission line to the anode.

In another embodiment, a Schottky diode can be used as the diode. The Schottky diode has fewer ohmic losses and a lower breakdown voltage.

In a particular embodiment of the interlocking circuit, a CAN driver, which generates the echo, is connected to the transmission line and the transmission side of the receiving line.

This type of CAN driver converts signals from a CAN bus to a serial bus. Various bus protocols can be used on this bus, such as RS232, SPI, I$^2$C or UART. The following provides a representative description of UART.

Conventionally, both buses are realized through two single-wire lines. A few known CAN driver components generate an echo on the UART-side bus. Specifically, when a serial signal is received at the TxD input, an echo appears with a slight time delay on the RxD output of the UART. Of course, the actual useful function is also fulfilled and this signal is forwarded on the CAN side.

Here, it is only possible to implement the physical layer (low-voltage differential voltage signals) on the CAN side, with the result that the UART protocol is transmitted on the physical CAN layer. Alternatively and in addition to the physical implementation, it is also possible to carry out a complete conversion of the data protocol (data security layer) from UART to CAN.

On the one hand, the echo may offer the desired functionality, such as performing the plausibility check described in the state of the art of technology for correct data transmission. On the other hand, this echo may interfere with the communicating components. This way, the state machine of a connected component (e.g. LMM) may malfunction if a message (data word) is sent to the component over the echo and if this message is not one that the component was expecting.

In another embodiment of the interlocking circuit, an actuation component for light actuation is connected to the interlocking circuit.

The interlocking circuit here prevents the echo from reaching the actuating component.

In a particular embodiment of the interlocking circuit, at least one light matrix manager module is connected to the transmission line and the receiving side of the receiving line as a special actuating component for light actuation. In this setup, the minimum of one light matrix module sends the signal over the transmission line.

This provides and advantage in that the functionality of the LMM can be improved, as no unwanted messages are received over the receiving line on the LMM.

In a particular embodiment of the light matrix manager module, a component can be used with the type designation TPS92661. Of course, alternative components that provide the same functionality are feasible.

In another embodiment, the interlocking circuit is located between a CAN driver and an LMM. In this setup, the two communication partners communicate without the possibility of an echo generated by the CAN driver being received at the LMM and interfering with it.

The UART communication used by the LMM is not necessarily a common standard in automotive applications. This type of transmission may cause problems in the case of longer lines such as as those appearing in automobiles. Thus, a previously established bus or transmission protocol may be used such as CAN or LIN. CAN in particular seems to fulfill the conditions for the necessary data transmission rates, available signals and EMC robustness for the desired line lengths.

For this reason, a CAN transmission operation is selected for long line distances. It is converted into a UART transmission using a CAN driver located near the LMM.

This provides an advantage in that a transmission over greater distances can be carried out with an acceptable transmission rate.

This type of transmission rate may be 500 kBit/s. At these bit rates, it is a good idea to use a CAN driver because the CAN signal is a low-voltage differential signal and is less vulnerable to damping and reflection.

Typically, inputs are high-impedance, but at a characteristic impedance of 120 ohms for single and double-wire lines, preventing reflections (180-degree reflections) would require low-impedance terminating resistors.

A pull-up resistor is simultaneously a terminating resistor and also must be dimensioned properly with respect to the described effects. The EMC measurements carried out are an additional aspect. This type of arrangement with a pull-up resistor will be sensitive with respect to irradiation resistance. When a low-impedance pull-up resistor is present, the interference resistance increases.

In another embodiment, a control unit exists called the Master ECU (MCU), e.g. implemented using a microcontroller, which controls the LMMs. If only one UART communication method and no CAN communication is possible for the control unit, then an additional CAN driver can be used on the control unit side. This driver converts the UART signals to CAN and is connected to the other CAN driver over a (potentially long) line. The other CAN driver uses the UART signals to generate CAN signals that can be read by the LMM.

Because the MCU may also be communicating over UART, it may be necessary to use two CAN drivers on the transmission path. The first is located near the MCU microcontroller and a UART transmission takes place between the two drivers. On the CAN side, a (potentially long) line to the headlight is connected. Before the line reaches the LMM, the CAN connection is converted back into a UART connection by a second CAN driver located near the LMM. This same signal path exists twice to guarantee full-duplex transmission.

In a particular embodiment of the interlocking circuit, the interlocking circuit is positioned on a printed circuit board that also holds the CAN driver, a communication interface and the minimum of one light matrix manager module.

As an advantage, a printed circuit board makes it possible to interconnect multiple components to form a module. It is then possible to manufacture the module in large-scale production, ensuring both easy handling and standardized use of the module, e.g. in a headlight or its housing. Various components or functionalities only have to be provided once. For example, this applies to components in the context of power supply or a clock.

In its simplest form, a communication interface consists of a connection option for one or more cables, over which the CAN communication is implemented. The MCU can use this interface to communicate with the LMM. This setup involves sending the signal over the circuit board, and thus over the CAN driver and interlocking circuit, to the LMM. The same is true for the signal path in the opposite direction.

In another embodiment, multiple LMMs exist on one printed circuit board. This is suitable in cases where, for example, various light functions within a headlight are to be implemented with various LMMs that may be positioned close together. This then creates synergies, as described, since some components only need to be provided once for each printed circuit board.

In a particular embodiment of the interlocking circuit, a printed circuit board is designed such that it can be equipped in accordance with Claim 6 or, as an alternative, can be equipped in a way that allows for a direct connection between the communication interface and the light matrix manager module.

As an advantage, the same printed circuit board can be used here regardless of whether inventive communication is taking place via CAN with conversion to UART or whether traditional UART communication is used between the MCU and LMM.

In the second case, the signal must essentially be looped through from the communication interface to the LMM. "Direct communication" here refers to a setup where no protocol conversion is carried out by a CAN driver or where there is an interlock. Some designs may involve passive components such as input or pull-up resistors.

The advantage of a printed circuit board for either setup lies in its flexibility during manufacturing. This allows the headlight housing to be built identically in either scenario, since the same circuit board holder is provided for both variants. Production costs can be decreased, since only one version of the circuit board has to be developed, tested and/or produced.

One method for suppressing an echo on the receiving line involves detecting a signal on a transmission line and then locking the transmission on the receiving line for the duration of the signal.

In an additional embodiment of the method, a control signal is derived from the transmission signal. This signal is inverted and linked to form an OR-link with the signal that is present on the receiving line on the transmission side, provided that the signals have negative logic, as is common for the RS-232 port, for example. The result is the receive signal locked under the described circumstances, which can be forwarded to the communication partner.

If the signals have positive logic, then an AND-link is formed instead of an OR-link.

In another embodiment of the method, the control signal is extended so that locking takes place for a longer period of time than the signal is present on the transmission line.

A headlamp system consists of several light sources, a matrix control system for these light sources, an interface for communication with the matrix control system, a CAN driver and an interlocking circuit in accordance with this invention.

As an advantage, an integrated headlight system can be provided that merely needs to be installed into a vehicle and have its interface connected to the CAN. This reduces the variation in terms of hardware and makes it possible to relieve the OEM (and possibly other parties) of a greater number of processing steps. As a result, the supplier retains as large a portion of the value creation chain as possible.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
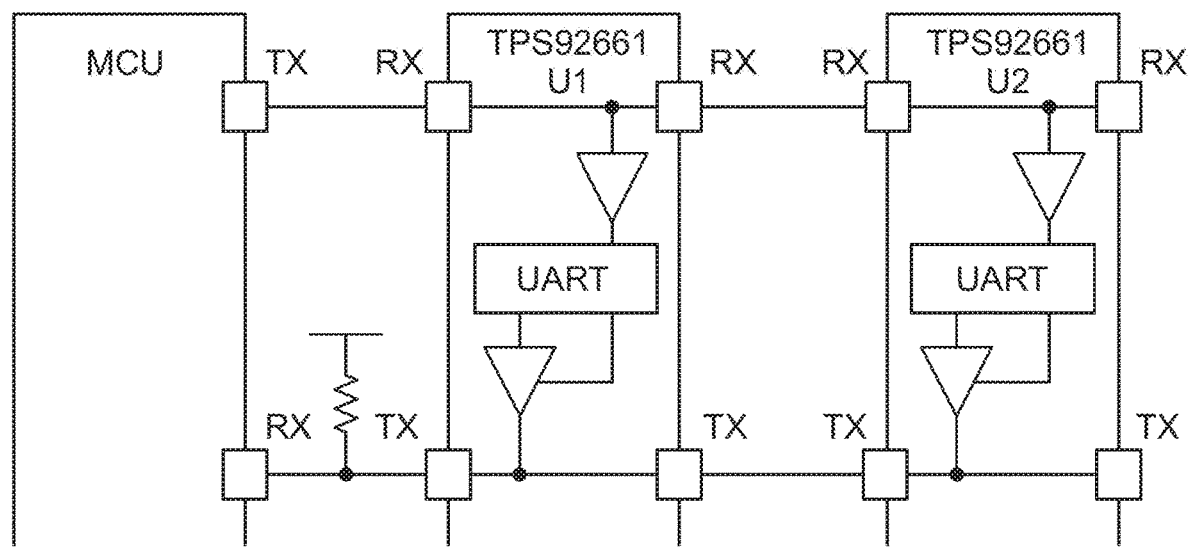
FIG. 1 shows a communication architecture between a control device and light matrix management modules.

FIG. 1 describes a design for a communication architecture between a control device (Master ECU (MCU)) and various light matrix management modules (LMMs).

Here, an architecture is shown that allows for full duplex communication. The transmission output (Tx) for the MCU is connected to the receiving inputs (Rx) of all LMMs. The same applies to the transmission outputs (Tx) for all LMMs connected to the receiving inputs (Rx) of the MCU.

One advantage of this arrangement is that it is inexpensive to implement as a solution. It may be the most inexpensive of all solutions presented here. This setup allows distances between the MCU and the LMMs of up to 50 cm or 70 cm to be bridged without impeding the EMC durability too significantly.

FIG. 2 shows two different architectures.

Figure 2A:
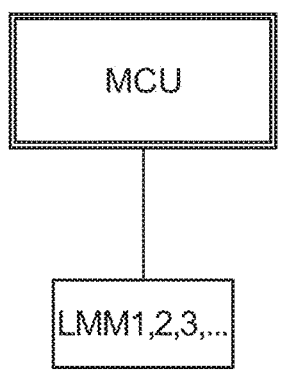
FIG. 2 shows various architectures for connecting multiple light matrix management modules.

FIG. 2a shows a point-to-point (PtP) connection between an MCU and multiple LMMs arranged on a printed circuit board (PCB). Between the MCU and the printed circuit board, there is a cable connection over which it is preferable to implement a CAN or UN connection.

There must be an internal clock available on each printed circuit board and this clock must be used to sense the UART communication signal. This is because there is no clock provided that is generated outside of the printed circuit board. For the PtP variant, only one pulse generator is necessary for the entire printed circuit board. The multiple LMMs have access to this pulse generator.

For the PtP variant, the EMC susceptibility to interference can be improved by adding a totem pole push-pull output stage for the transmission signal (Tx) of the LMM.

Figure 2B:
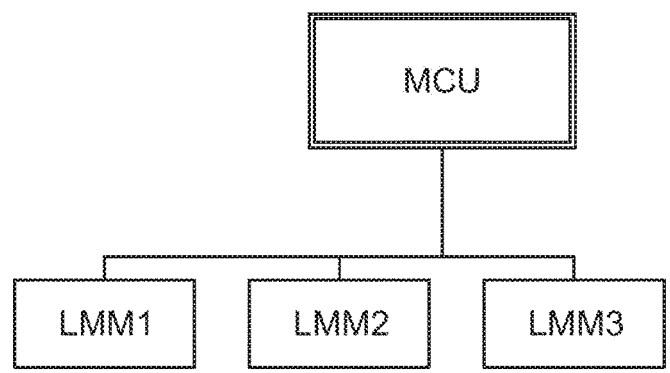

FIG. 2b shows a point-to-multipoint (PtM) connection between an MCU and several LMMs, all of which are arranged on a printed circuit board. There is a cable connection between the MCU and the various printed circuit boards that is ideally established using a CAN or UN connection. This can create a Y configuration, which consists of individual cables from the MCU to each printed circuit board (and, as a result, each LMM) or bus architecture in accordance with FIG. 1.

The PtM variant requires several pulse generators (typically one for each printed circuit board). This can make the PtM variant more expensive than the PtP variant. The same is even more true of the increased current consumption generated by several pulse generators if they are operated with 5V instead of 3.3 V or communication is carried out using the higher of the two voltage types.

The total pull-up resistor value must be observed in the PtM variant. When equipping the printed circuit boards, it may be necessary to select the pull-up resistor values based on the number of printed circuit boards to be connected. Depending on the type of circuit, the various pull-up resistors may be switched in parallel. This means that the resistor values should be selected so that they do not lie below a minimum value. For example, the total resistor value can be 1, 2 or 5 kiloohms.

Certain applications, such as those in automobiles, require specific minimum data transmission rates that are subject to any applicable EMC influence. For example, data transmission rates of 500 kbps may be required at a cycle rate 16 times higher (corresponding to 8 MHz). This cycle rate may be too high for secure transmission and distribution via cable.

The PtM variant can also be used in a single headlamp, but usually, each printed circuit board is responsible for a different function (such as the cornering light, high beam, low beam).

Figure 3:
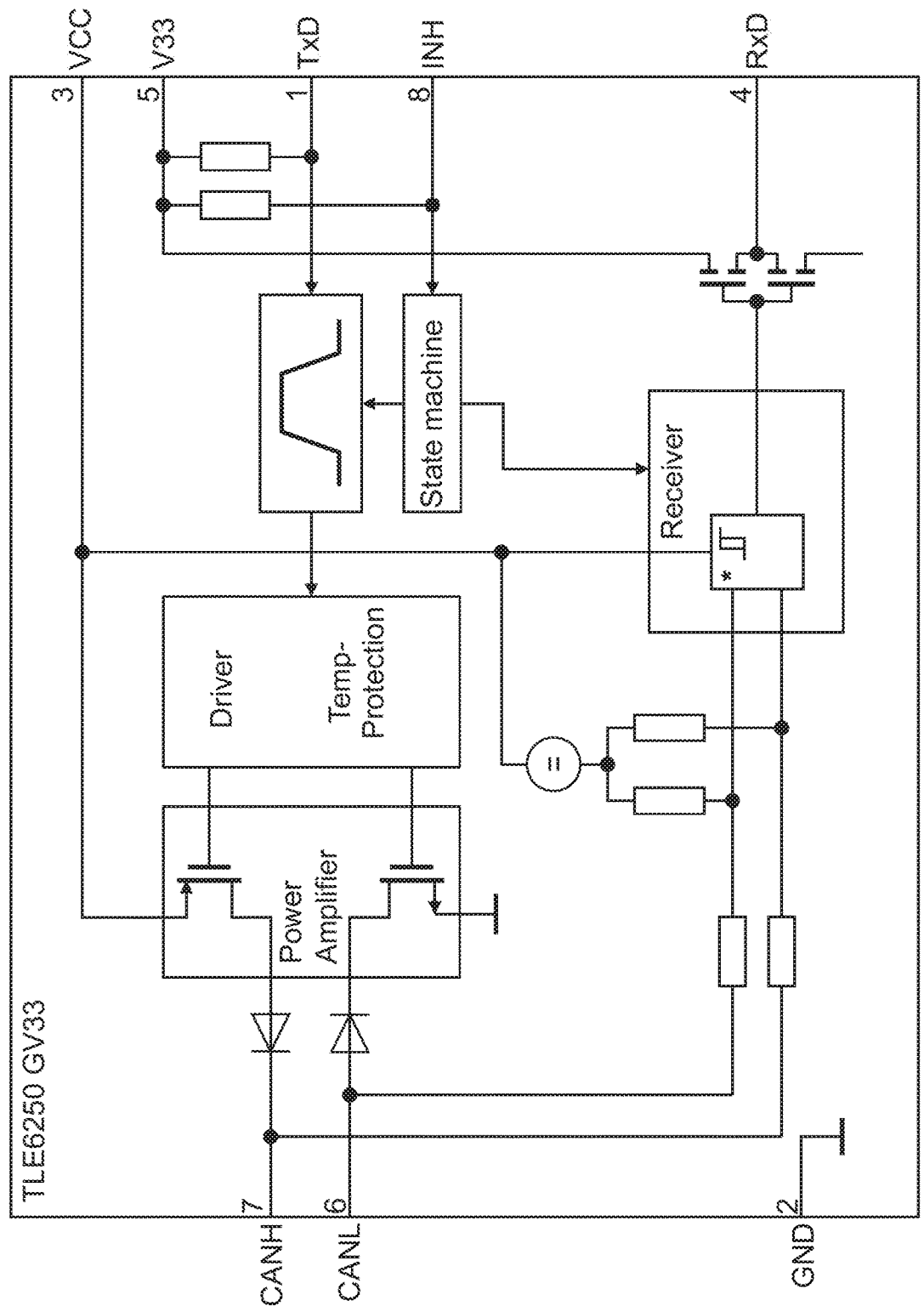
FIG. 3 shows a block diagram for a CAN driver.

FIG. 3 shows a block diagram of a CAN driver that provides conversion between the CAN signals on the left side and UART signals on the right side.

In this drawing, it is important to note that the pin designated "TxD" is an input. This means that the Tx signal of the communication partner must be connected here.

Likewise, the RxD pin identifies an output at which the CAN driver transmits data.

A CAN driver or CAN-UART converter converts 5V (or 3.3 V) UART Tx and Rx signals into CAN CANH and CANL signals, which are known to consist of low voltage and differential signals. These types of signals can be transmitted more easily over longer distances. This is frequently achieved using twisted cables. The CAN driver also fulfills other automotive requirements, such as short circuit protection to the ground and on-board supply voltage (12 V).

Unfortunately, these drivers generate a local echo. This forwards signals fed to the UART-side input (TxD) to the CAN side, at which point they reach the CANH and CANL. From there, they are transmitted to the receiver block, where they are made available to the UART-side RxD output.

A microcontroller can suppress the echo by blocking the receive interrupt or even utilizing the echo signal by verifying that the received signal is the same as the transmitted signal.

However, this process will probably interfere with the LMM and its internal state machine if the machine receives bit sequences from the echo that are not part of its architecture. In other words, this can cause the state machine of a connected LMM to malfunction if a message (data word) is sent to the LMM over the echo and if this message is not one that the LMM was expecting.

Figure 4:
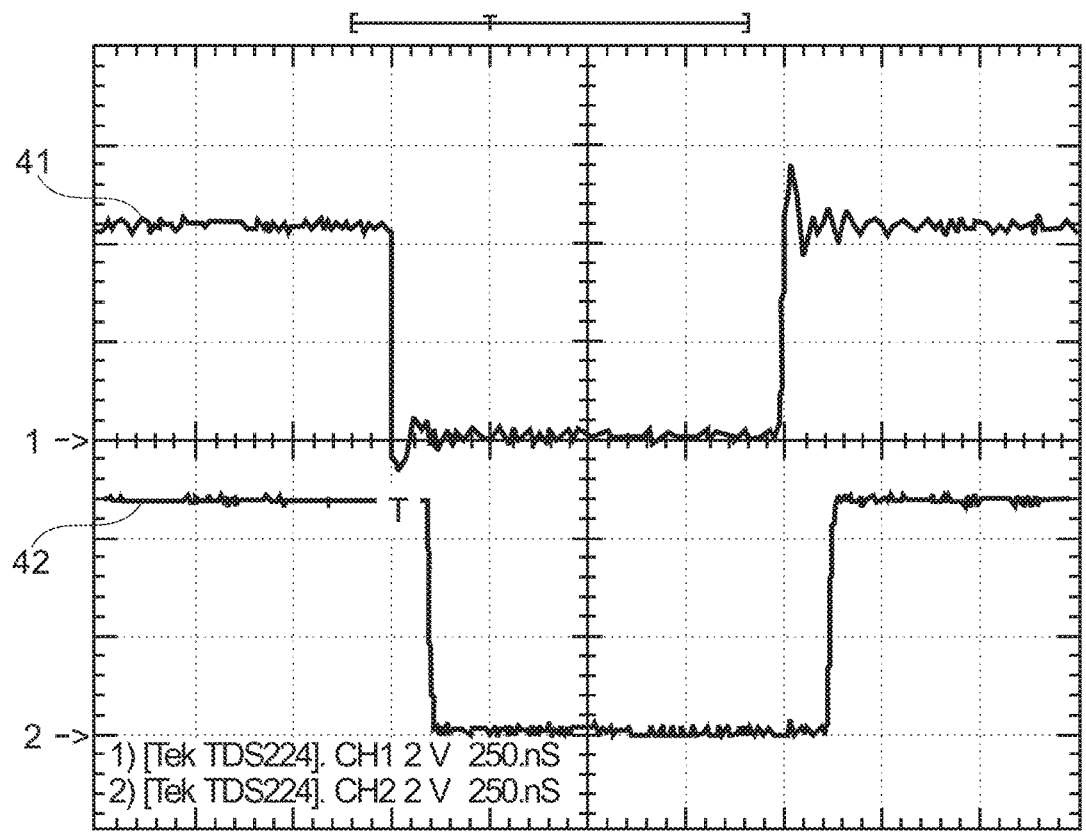
FIG. 4 shows the measurement for the input and output of a CAN driver.

FIG. 4 shows a measurement of a CAN driver where a signal (41) of the LMM is transmitted to the TxD input of the CAN driver and an echo signal (42) is generated at the RxD output of the CAN driver. There is a delay between the signals (in this case, approximately 100 Ns). Accordingly, an interlocking circuit must be dimensioned such that it locks before the beginning of the echo and this lock is not released until the echo disappears. In this example, this means that interlocking circuit must activate faster than 100 Ns after the leading edge of the TxD signal and, after the trailing edge, must block more than 100 Ns after the TxD signal deactivates.

Two commercially available components for the CAN driver are recommended. As described in the data sheet, the TLE6250 features a transmission delay between 150 Ns and 280 Ns for both edges. As described in the data sheet, the TJA 1051 features a transmission delay of 40 Ns to 250 Ns.

Figure 5:
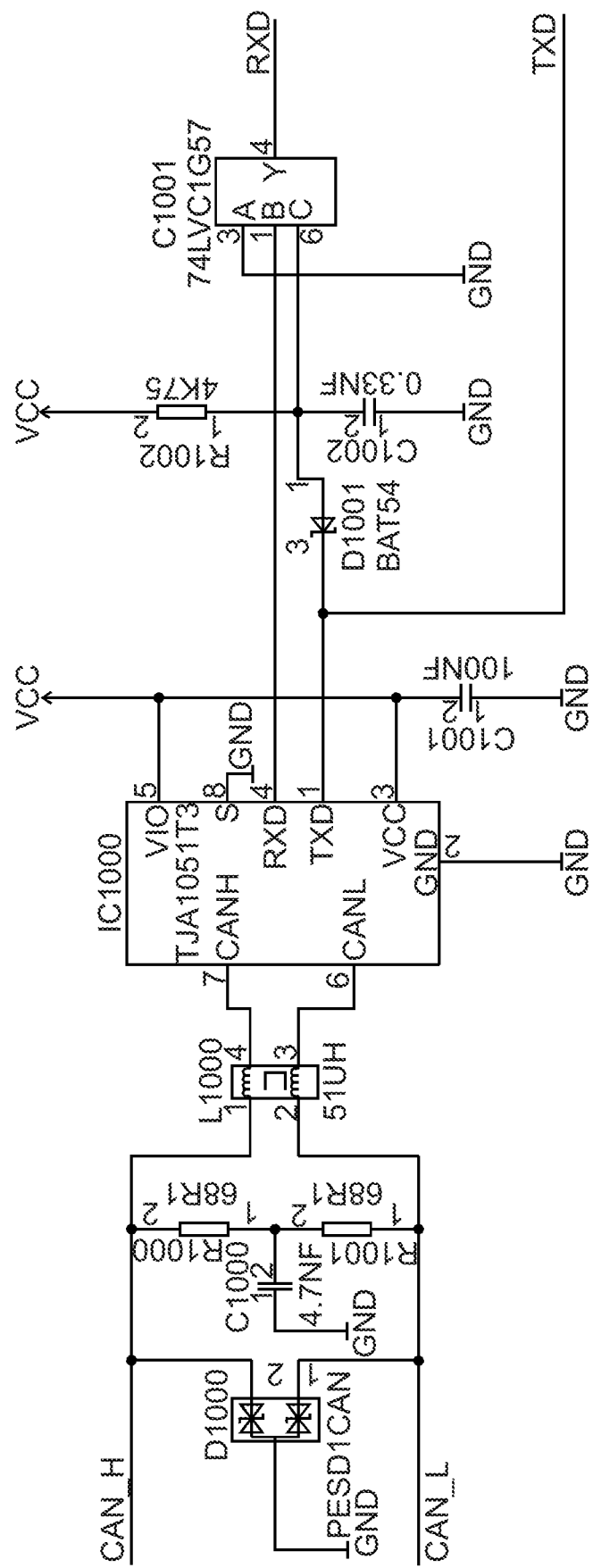
FIG. 5 shows an implementation of the switches in the form of a circuit

FIG. 5 shows the circuitry (wiring) of a CAN driver with an interlocking circuit.

The IC1000, the CAN driver located in the center, conducts conversions between the left CAN signals (CANH, CANL) and right serial UART signals (RxD, TxD).

There are components between the CAN inputs/outputs and the CAN driver that are the basic wiring for interference suppression, e.g. a L1000 bifilar inductor or R1000, R1001 resistors for the bus end termination.

Figure 10:
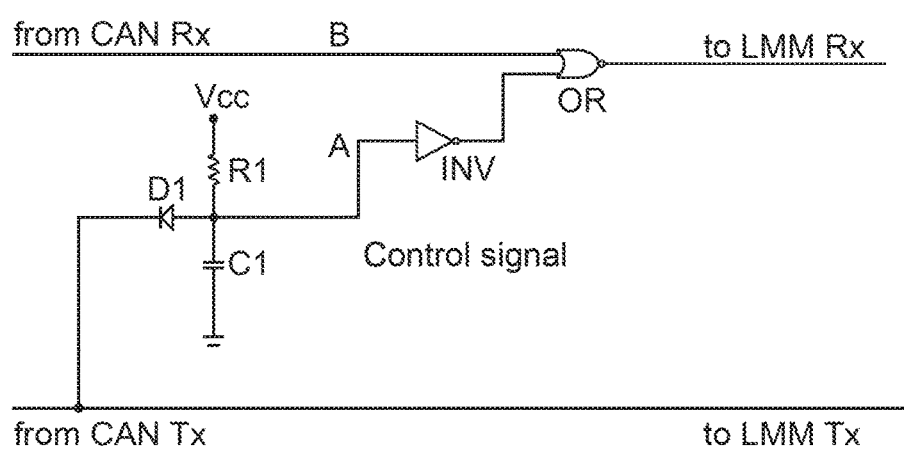
FIG. 10 shows a delay circuit in conjunction with the interlocking circuit.

The D1001, R1002, C 1002 components are used as a delay element unlocking in accordance with FIG. 10.

Figure 6:
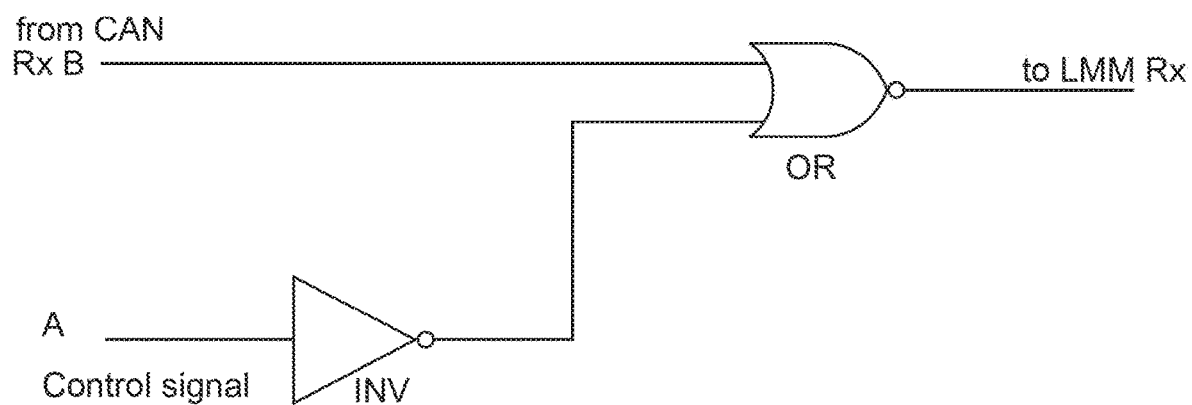
FIG. 6 shows a circuit logic for an interlocking circuit.

The IC1001 component is used for logical wiring for blocking the receiving line in accordance with FIG. 6.

It is worth noting again that, from the perspective of the CAN driver, the cable designated "TxD" that transmits the data from the connected LMM to the CAN driver is an input despite what the designation indicates.

In FIG. 6, a circuit logic is recommended that provides a logic function for 0 active levels (negative logic) in accordance with the Rx formula=(NOT A) OR B, where A is a control signal that, when it is active, blocks signal B. The control signal is derived from the transmission signal and, in the simplest cases, these signals are identical.

Signal B is the transmission-side Rx receiving line (from CAN Rx), i.e. the RxD output signal from the CAN driver.

In a hardware configuration, the control line containing the control signal is connected to the input of an inverter (INV), whose output is connected to one of two inputs of an OR gate. The second input is connected to the transmission side of the receiving line (from CAN Rx), e.g. the RxD pin of the CAN driver. The output of the OR gate is connected to the receiving side of the receiving line (to LMM Rx), e.g. the Rx pin of the LMM(s).

It should also be mentioned that this interlocking circuit does not have a direct connection between the RxD output of the CAN driver (from CAN Rx) and the Rx input of the LMM component (to LMM Rx), but instead a connection is simply established using the gate such that it can be used for locking (if necessary). Otherwise, the Tx transmission line can directly connect the two components from "from LMM Tx" to "to CAN Tx".

The preceding circuit is suitable for signals with negative logic (0-active logic). If there is positive logic, meaning that the bit value (1) is generated by a high level, the OR gate must be replaced by an AND gate to ensure that the interlocking function is identical.

This logic function can be creating using configurable multifunction gates such as the 74LVC1G57, 74LVC1G97 and 74LVC1G98 components.

The 74LVC1G57GW-Q100 is ideal because it is affordable and qualified for automotive applications.

Figure 7:
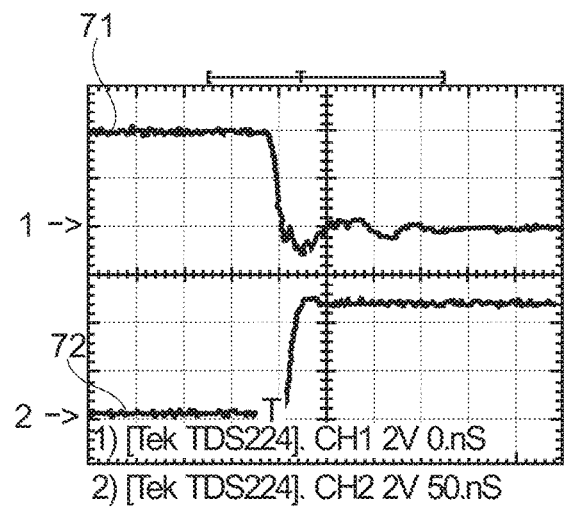
FIG. 7 shows a measurement for the transmission delay of a leading edge.
Figure 8:
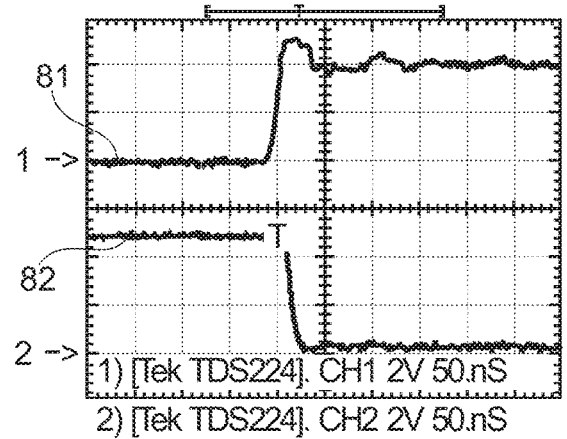
FIG. 8 shows a measurement for the transmission delay of a trailing edge.

FIGS. 7 and 8 show the transmission delays for these logic circuits, which have switching times of less than 8 Ns, making them fast enough to block the receiving line before the CAN driver receives the echo.

Curves 71 and 81 show an A or Tx input signal in the logic circuit, while curves 72 and 82 show the resulting output signal.

FIG. 7 shows the curve progression for the leading edge, while FIG. 8 shows this curve progression for the trailing edge.

Figure 9:
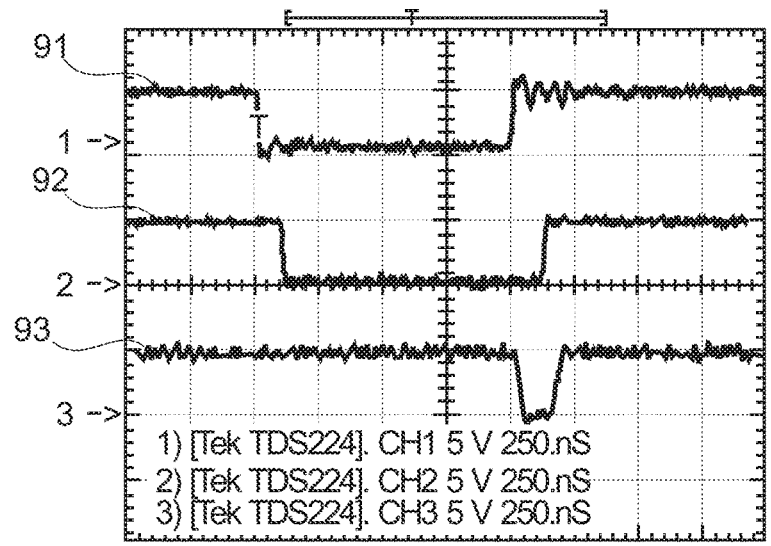
FIG. 9 shows a measurement with an interlock duration that is too short.

FIG. 9 depicts the issue of the interlocking circuit switching in time before the leading edge of the echo (in accordance with FIG. 6), but not waiting until after the end of the echo to unlock again. In this case, the interlock would have to remain active for 280 Ns after the end of the signal in the transmission line in accordance with the measurement.

In signals with negative logic, the leading edge is falling (from high to low level) and the trailing edge rising (from low to high). In signals with positive logic, the reverse is true.

Signal 91 is the signal present in the Tx transmission line, i.e. the TxD input signal of the CAN driver. The echo signal (92) that appears on the transmission side of the Rx receiving line is the output signal of the CAN driver. Signal 93 shows the unwanted part of the echo which would have still been let through because an exclusively available circuit in accordance with FIG. 6 would not be locked long enough.

FIG. 10 shows a circuit that causes a delay in disabling the control signal for locking; in other words, a time delay with a time delay constant.

A D1, D1001 diode is switched in the reverse direction between the transmission line and control line. Its cathode side faces the transmission line and its anode side faces the control line. This means that if the Tx is a high level, the diode locks. If it is a low level, it allows energy to pass through. This ensures that a falling edge of the Tx signal that corresponds to the leading edge in negative logic is transmitted immediately to the control signal. Conversely, a rising edge locks the diode, which then makes the control signal dependent on the other components.

Control line A is connected to the Vcc supply voltage via an R1, R1002 resistor and to ground with a C1, C1002 capacitor. The capacitor discharges a low level of the Tx signal via the diode which is then switched in the forward direction. Otherwise, the capacitor discharges from the low to high level at a speed that corresponds to the component values. The switchover point of the control signal is determined by the switching level (e.g. Vcc/2). The time constant is determined by the resistor and capacitor value.

From this point, the downstream logic circuit would switch from the inverter (INV) and OR gate. This was presented in FIG. 6.

Figure 11:
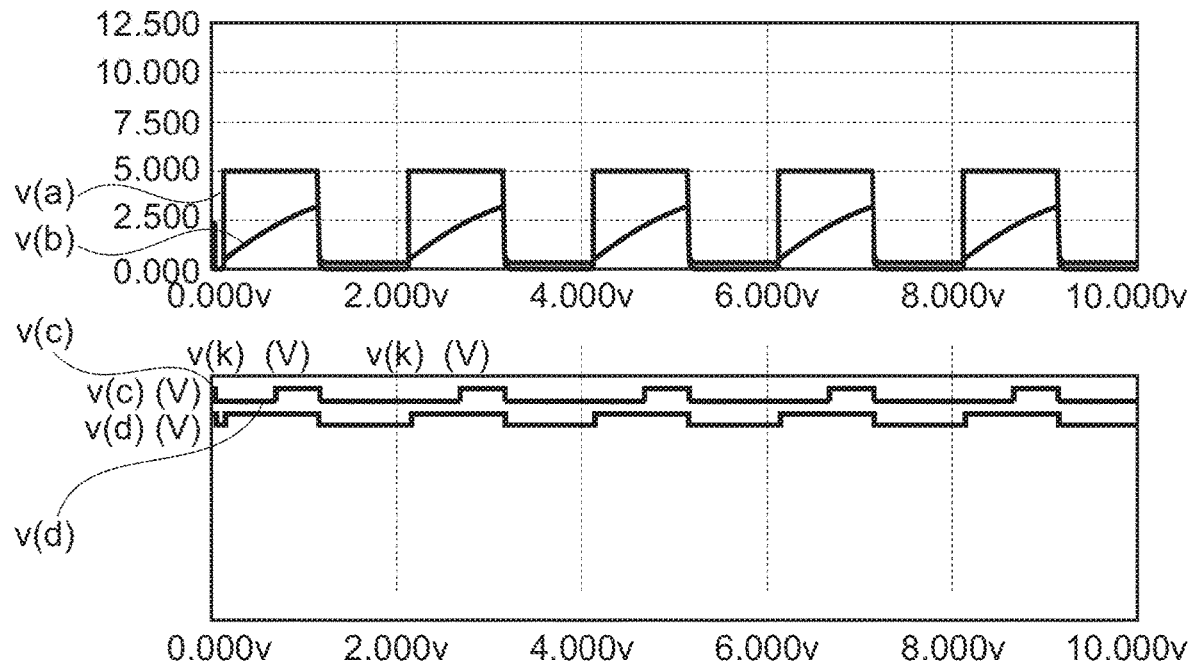
FIG. 11 shows a signal measurement from FIG. 10.

FIG. 11 shows a measurement of the signals. v(a) is the measurement of the analog Tx signal, v(b) the measurement of the analog control signal, v(c) the measurement of the digital control signal and v(d) the measurement of the digital Tx signal.

An alternating 0-1 bit sample is used for this measurement, as can be seen when looking at the equidistant edges of the digital Tx signal v(d). The digital control signal that shows the durations of active locking now has a delay and is activated again after the trailing edge of the Tx signal. As such, the unwanted remainder of the echo signal shown in FIG. 9 can now also be suppressed.

Optionally, other components that carry out other or improved functions may lie along the signal paths between the described components. For example, signal driver stages can still be installed between the Tx cable and diode or the RC element and logic circuit.

The time constant of this measurement is selected to ensure that it corresponds to half the duration of a bit (approx. 500 Ns). This permits enough tolerance for the required delay and activates the interlocking circuit again when the stop bit is generated, enabling communication without limitations to the chronological sequence. The receive channel is reactivated to receive more communication from the MCU right after locking.

Figure 12:
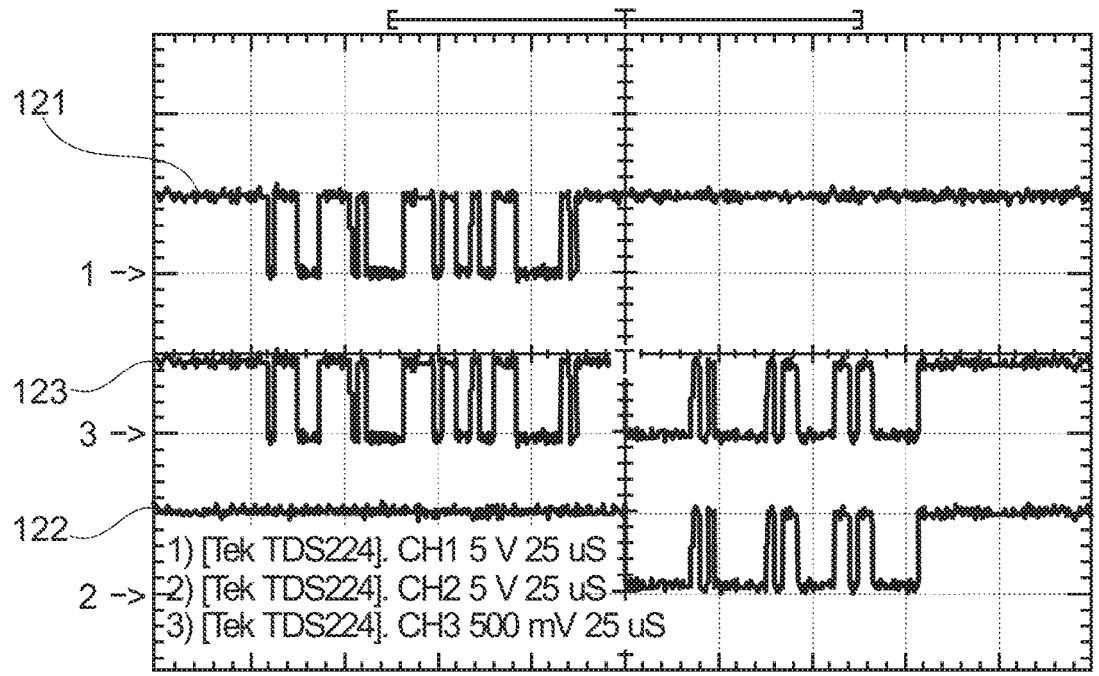
FIG. 12 shows a measurement of the communication between the CAN driver and light matrix management module while using the delay circuit in conjunction with the interlocking circuit.

FIG. 12 shows communication between an MCU and an LMM via a CAN driver in which the interlocking circuit is used in accordance with FIG. 10. Here, a data word is transmitted from the MCU to the LMM, which then responds by transmitting a data word to the MCU.

Signal 121 is the bit sample that is transmitted from the MCU to the LMM via the receiving line (Rx) of the CAN driver and can contain a request to the LMM to transmit this data. This signal is measured on the receiving side of the LMM, i.e. downstream from the output of the interlocking circuit gate.

Conversely, signal 123 is the receiving line signal, but is measured on the output side of the CAN driver. Here, the echo in the right half of the measurement that resulted from the Tx signal is visible.

Signal 122 shows the aforementioned Tx signal on the signal line, which may be, for example, the requested data that the LMM transmits to the MCU or CAN driver.

As such, the inventive circuit was used to suppress the echo of the response from the LMM.

Figure 13:
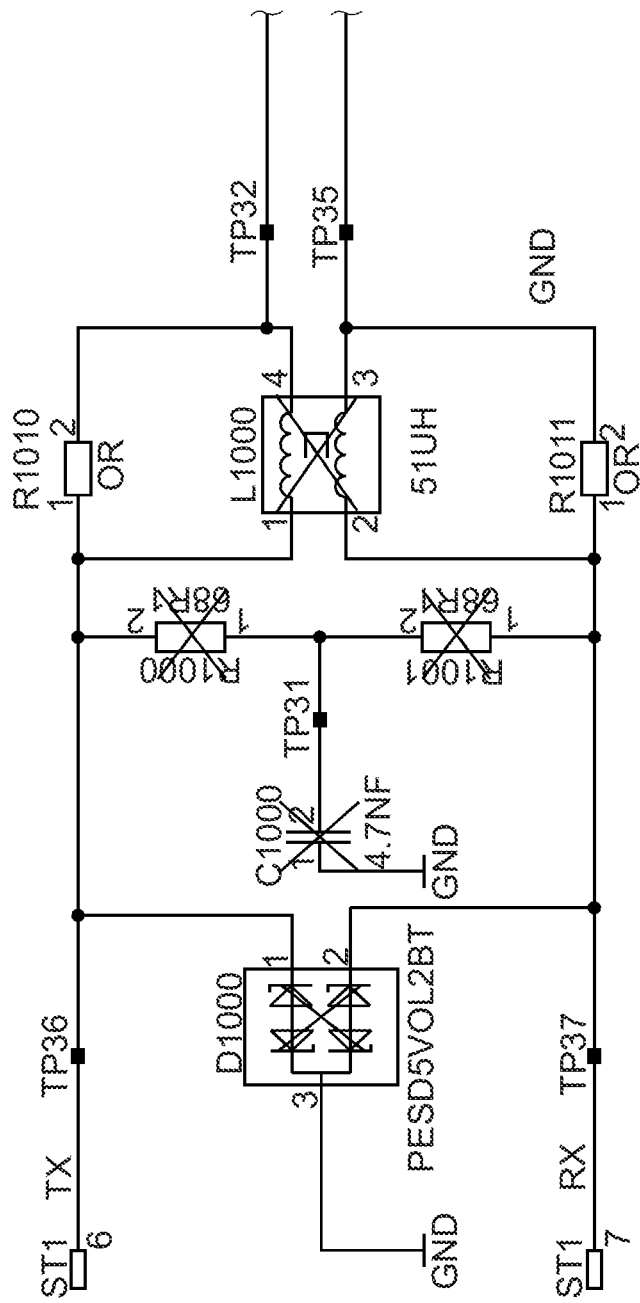
FIG. 13 shows an assembly variant for a printed circuit board.
Figure 13:
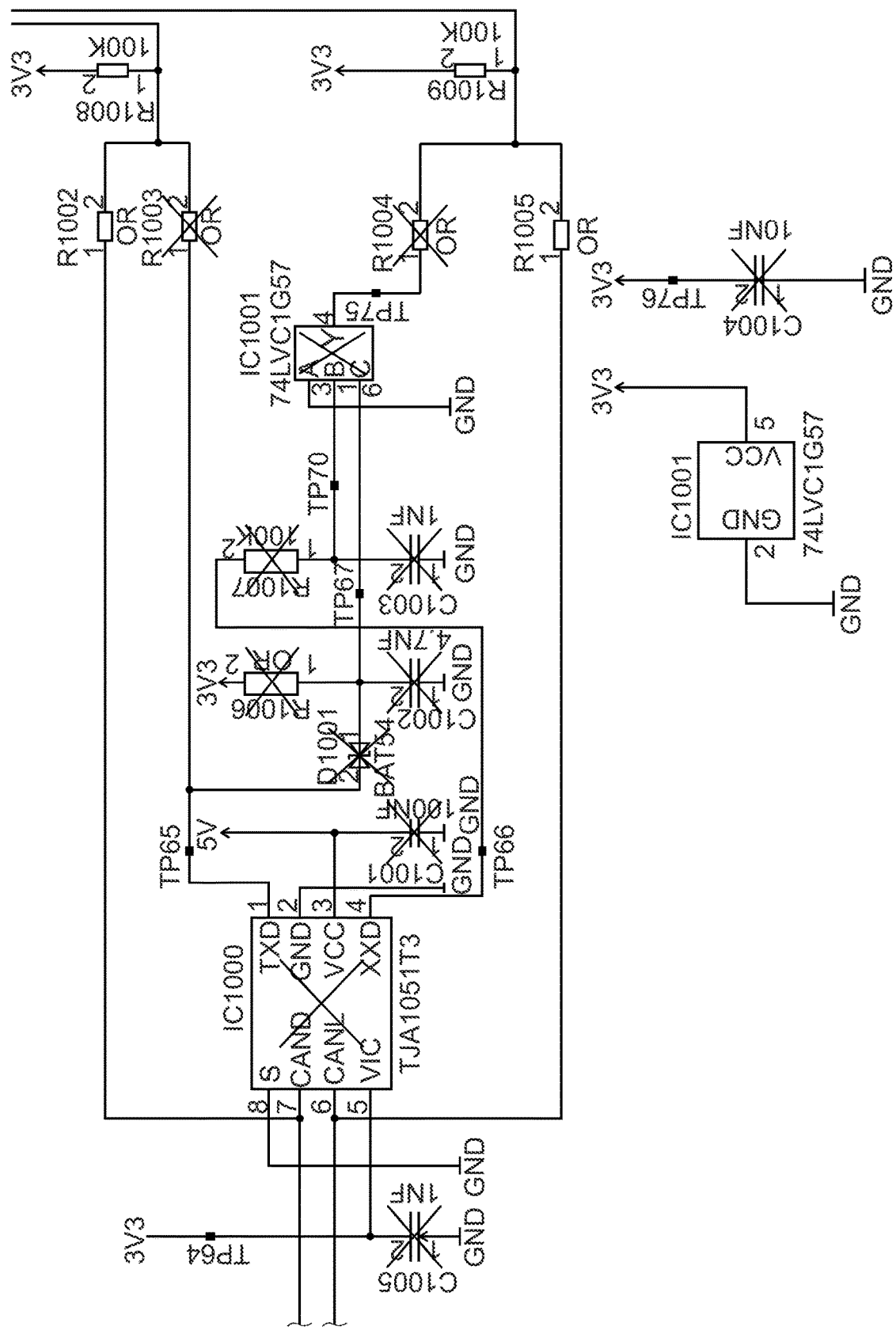

FIG. 13 shows a configuration variant for a printed circuit board that permits configuration in accordance with the circuit from FIG. 5, as indicated by the crossed-out components in the figure. However, an alternative configuration is shown here in cases where CAN communication is not carried out between the MCU and LMM, but direct UART communication is used instead.

Essentially, the ST1-T or CANH output pin is simply connected to the UART-side Tx via the R1010 resistor with the R1008 pull-up. Likewise, the ST1-Rx or CANL input pin is simply connected to the UART-side Rx via the R1013 resistor with R1009 pull-up. A short circuit in place of contact resistors is also conceivable.

REFERENCE NUMERAL LIST

MCU Master ECU, control unit
Tx Transmit pin, transmission line
Rx Receive pin, receiving line
TPS92661 Light matrix management module, type TI TPS92661
LMM Light matrix management module
CANH Can high connection
CANL Can low connection
Vcc Supply voltage
TxD Connection for transmission line, input in CAN driver
RxD Connection for receiving line, output from CAN driver
41 Signal to transmission line
42 Signal to receiving line (here, echo)
D1000, Components for CAN input circuit
C1000,
R1000,
R1001,
L1000
IC1000 CAN driver
D1001, (D1), Components for delay circuit
R1002, (R1),
C1002, (C1)
IC1001 Logic component
A Control signal
B, Transmission-side receive signal
from CANRx
toCANRx Receiving-side receive signal
INV Inverter OR OR gate
71 Input signal of a logic component of a leading edge
72 Output signal of a logic component of a leading edge
81 Input signal of a logic component of a trailing edge
82 Output signal of a logic component of a trailing edge
91 Transmission signal to toCANTx
92 Receive signal to fromCANRx
93 Remaining echo signal to toLMMRx
toCANTx Transmission line connection to CAN driver
fromLMMTx Transmission line connection to LMM
v(a) Measurement of the analog transmission signal
v(b) Measurement of the analog control signal
v(c) Measurement of the digital control signal
v(d) Measurement of the digital transmission signal
121 Bit sample signal from MCU to LMM (request)
122 Bit sample signal from LMM to MCU (reply)
123 Signal at the RxD output of the CAN driver
R1010, Contact resistors
R1013
R1008, Pull-up resistors
R1009

The invention claimed is:

1. An interlocking circuit for suppressing an echo, the circuit comprising:
   a receiving line (Rx);
   a transmission line (Tx);
   wherein the receiving line is locked when there is a signal on the transmission line (Tx),
   where the receiving line has a first receiving side at which the echo signal is present as well as a second receiving side at which the echo signal is blocked;
   wherein a control signal derived from the signal on the transmission line is on a control line, where the control line is connected to an input of an inverter (INV), which has an output connected to an input of an OR gate for signals with negative logic or an AND gate for signals with positive logic, where a second input of the OR gate or the AND gate is connected to a transmission side of the receiving line and an output of the OR gate or the AND gate to the first receiving side or the second receiving side of the receiving line.

2. The interlocking circuit in accordance with claim 1, wherein a delay circuit (D1+R1+C1) influences the control signal (A) such that the interlocking circuit interlocks for a longer period than a period during which the signal is on the transmission line.

3. The interlocking circuit in accordance with claim 2, wherein the delay circuit connects the transmission line to the control line (A) via a diode and the control line to a supply voltage and a capacitor (C1) to the ground via a resistor (R1).

4. An interlocking circuit for suppressing an echo, the circuit comprising:
   a receiving line (Rx);
   a transmission line (Tx);
   wherein the receiving line is locked when there is a signal on the transmission line (Tx),
   where the receiving line has a first receiving side at which the echo signal is present as well as a second receiving side at which the echo signal is blocked;
   wherein a CAN driver generates the echo and is connected to the transmission line and the transmission side of the transmission line.

5. An interlocking circuit for suppressing an echo, the circuit comprising:
   a receiving line (Rx);
   a transmission line (Tx);
   wherein the receiving line is locked when there is a signal on the transmission line (Tx),
   where the receiving line has a first receiving side at which the echo signal is present as well as a second receiving side at which the echo signal is blocked;
   wherein at least one light matrix manager module is connected to the transmission line and the first receiving side or the second receiving side of the receiving line, where a minimum of one light matrix manager module transmits the signal to the transmission line.

6. The interlocking circuit in accordance with claim 5, wherein the interlocking circuit is positioned on a printed circuit board that also holds a CAN driver, a communication interface and the minimum of one light matrix manager module.

* * * * *